May 13, 1930.  C. L. HEISLER  1,758,832
FILM DRIVING APPARATUS
Filed March 27, 1929
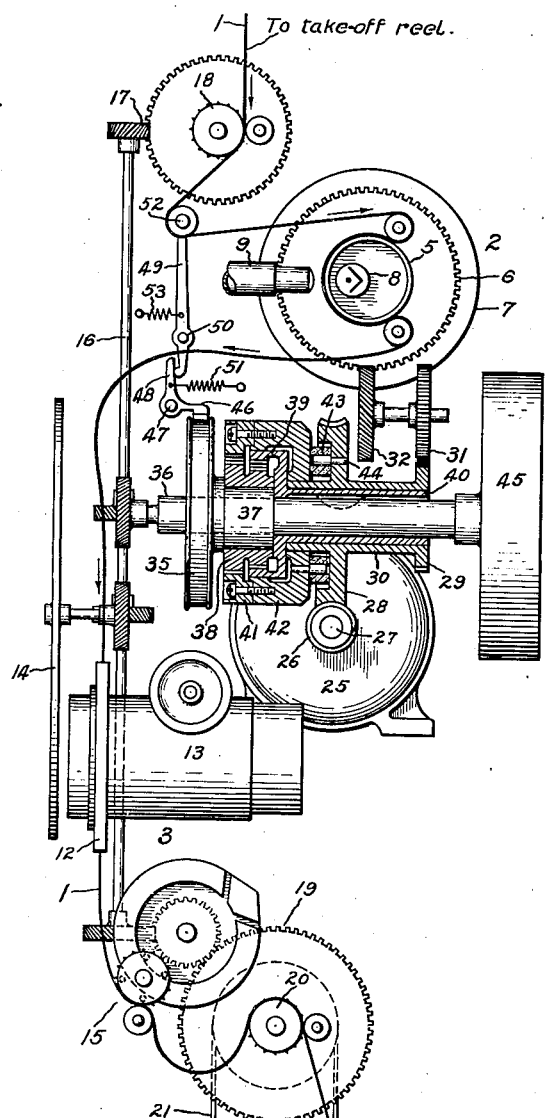
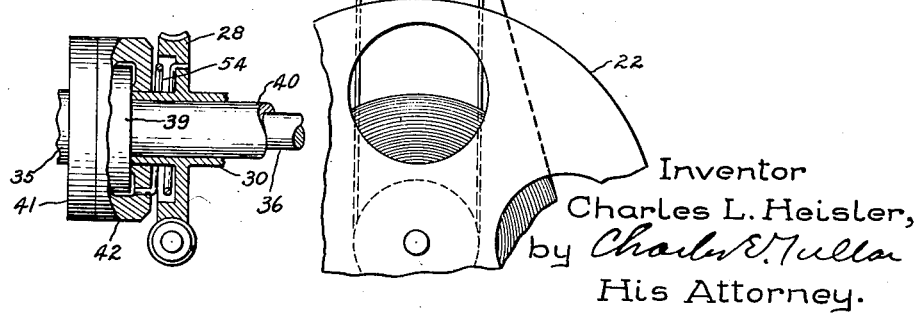
Inventor
Charles L. Heisler,
by Charles E. Mullen
His Attorney.

Patented May 13, 1930

1,758,832

UNITED STATES PATENT OFFICE

CHARLES L. HEISLER, OF SCHENECTADY, NEW YORK, ASSIGNOR TO GENERAL ELECTRIC COMPANY, A CORPORATION OF NEW YORK

FILM-DRIVING APPARATUS

Application filed March 27, 1929. Serial No. 350,405.

My invention relates to apparatus for recording sound on a film and to apparatus for reproducing sound from a film record. More particularly my invention relates to means for driving the film in apparatus of the abovementioned character, and it has for its object the provision of improved means for driving the film through the apparatus from a single driving source so that the speed of the film at the point at which the sound is being recorded in the case of a recorder or at the point at which the recorded sound is being taken from the film record in the case of a reproducer shall be uniform and unaffected by conditions affecting the speed of the film in other parts of the apparatus.

My invention will be better understood from the following description taken in connection with the accompanying drawing, and its scope will be pointed out in the appended claims.

I have chosen to illustrate my invention as applied to apparatus combining a film phonograph with a motion picture projector, both the sound and picture records being on the same film. In the drawing Fig. 1 represents a preferred embodiment of my invention, and Fig. 2 is a detail showing a modification.

Referring to Fig. 1, the film 1 of the motion picture type having in the present embodiment both picture and sound records thereon passes from the usual take-off reel, not shown, to the sound apparatus 2, thence to the picture apparatus 3, and then on to the usual take-up reel. The sound apparatus may be either a recorder or a reproducer and the picture apparatus may be either a camera or a projector. In the drawing I have chosen to show the sound apparatus as a part of a reproducer and the picture apparatus as a part of a projector.

The sound reproducer shown comprises the rotatable film supporting and driving drum 5 on the shaft of which is mounted the gear 6 and the flywheel 7. That portion of the film having the sound record thereon, although supported by the drum, overhangs the edge thereof and within the drum is a suitable photoelectric cell 8. A suitable optical system indicated in part at 9 projects a narrow transverse line of light on the moving sound record from which it passes on under the control of the record into the cell 8. In the well understood manner, impulses received from the latter after being amplified by suitable thermionic amplifying devices may be used to actuate a sound producing device such as a loud speaker. By this arrangement the film is supported at the point of light control by the drum. I may, however, support the film at the point of control by means of a skid or a gate to which the drum is closely adjacent, the drum in all cases giving to the film a movement which is uniform to that high degree necessary to the faithful reproduction of music.

The picture projecting apparatus illustrated is that common to apparatus of this character and comprises the gate 12, the objective 13, the shutter 14, and the intermittent film driving mechanism 15. The two latter members are shown connected by gears to the vertical shaft 16 at the upper end of which is a gear connection 17 to the sprocket 18 which serves to withdraw the film from the unwinding reel, not shown. By gear connection 19 with the intermittent mechanism the sprocket 20 is rotated and by means of a suitable connection, as for example the belt 21, the take-up reel 22 may be operated in the usual and well known manner.

The single driving motor 25 is connected to all of the film driving members of the apparatus. Its connection with the drum 5 is through the worm 26 on motor shaft 27, worm wheel 28 and gear 29 on sleeve 30 and gears 31, 32 and 6. Inasmuch as the film is driven jointly by the several sprockets and a drum and since it is highly desirable that there shall not be the slightest amount of slippage of the film on the drum, it becomes necessary to coordinate the motion of the drum and the sprockets so that both shall move the film at exactly the same speed regardless of any variation in the actual diameter of the drum from the theoretical diameter and regardless of variations in the length of the film due for example to shrinkage. In the present arrangement I prefer to positively connect the driving motor with the drum and by means of a variable connection between the motor and the sprockets to cause the speed of the latter to be varied automatically so that both drum and sprockets shall move the film at the same speed. This mechanism I have disclosed and claimed in my copending applications, Serial No. 203,344, filed July 5, 1927, and Serial No. 341,147 filed February 19, 1929, both assigned to the same assignee as the present application. The above mentioned mechanism I have termed a compensator and as shown on the drawing comprises the brake drum 35 loosely mounted on the shaft 36 and having an eccentric hub portion 37 upon which is journalled the double gear member 38. This gear member has two rows of teeth, the pitch diameter of one row being slightly smaller than that of the other, for example, the smaller gear may have one tooth less than the larger gear. Meshing with the smaller of the two gears is the internal gear 39 formed on the end of the sleeve 40 which is keyed to the shaft 36. Meshing with the larger of the two gears is the internal gear 41 secured to the ring 42 which is journalled in the sleeve 30 and on the outer face of the internal gear 39. Ring 42 has a drive connection with the worm gear 28 through a member composed of any suitable elastic material which member, for example, is shown in the drawing as the leather cushion ring 43. The ring has a series of holes therein into which project the pins 44, alternate pins being secured respectively to the ring 42 and the worm gear 28. At the end of the shaft 36 is a gear connection with the vertical shaft 16 and at the other end I have shown the flywheel 45. Under certain conditions sufficient inertia effect to insure steady running of the sprockets may be had from the mass of the compensator itself, or if this is not sufficient I may increase the mass thereof, for example, by enlarging the ring 42. Arranged to engage the brake drum 35 is the brake lever 46 pivoted at 47 and having the arm 48 which is engaged by the short arm of the lever 49 pivoted at 50. Spring 51 is connected to the brake lever to rotate it in a direction to apply the brake. The long arm of lever 49 carries the idler 52 engaging a loop in the film between sprocket 18 and drum 5, and has attached to it spring 53.

The operation of the compensator will readily be understood from the description and drawing. If the film is being moved somewhat faster by the sprockets than by the drum, the film loop engaged by the idler 52 will slowly increase in size and lever 49 moving counterclockwise will allow spring 51 to apply the brake 46 to drum 35 with greater force. The resulting decrease in rotative speed of the brake drum and the eccentric hub 37 carrying the double gear 38 slows down the speed of shaft 36 which drives the sprockets. It should be noted at this point in the description that the parts of the mechanism are so constructed that when the brake is out of contact with the brake drum and the elements of the compensator are rotating freely, the sprockets move the film even though it be new or unshrunken at an appreciably greater speed than the drum moves it. Also if the brake is applied with the full force of the spring 51 so that the brake wheel is held fixed, the sprockets move the film even though it be badly shrunken at an appreciably slower speed than the drum moves it. Conversely if conditions are such that the film is being moved somewhat slower by the sprockets than by the drum the loop decreases in size and the brake is slowly withdrawn until the sprocket speed increases to the proper amount.

In motion picture apparatus of the character which I have described wherein, for example, the film is withdrawn from a take-off reel, drawn through a gate by an intermittent motion mechanism, and wound up on a take-up reel, it is not unusual that the speed of the apparatus is found to undergo considerable variation even though the driving motor operates with a uniform torque. These speed variations are due to a variety of causes consisting in a large part to the varying resistance of the film and other moving parts. One or both of the reels may bind at certain angular positions thereof producing a periodic drag. Improper gear and sprocket action, displacement of the film on the sprockets and in the gate and warping of the film may produce a drag at frequent or recurring intervals. In the case of machines for showing pictures only, speed variations such as may be due to such causes are not noticeable to one observing the pictures but in the case of a machine which also reproduces sound recorded on the film it is essential that the film for proper sound reproduction be moved through the light beam, termed the point of control, at a uniform and unvarying speed since small variations in pitch are readily detected by the ear. Steadiness of rotation of the film drum 5 in the apparatus which I have described is effected in part by the use of the flywheel 7 directly connected therewith. It is further effected by eliminating from the film drum substantially all effects of the speed variations of the sprockets and reels. The rotating mass of the compensator and flywhel 45 or of the compensator alone where the flywheel is not used irons out more or less of the speed variations of the sprockets. Variations not thus absorbed are taken up by the cushion ring 43 inserted in the sprocket drive connection between the worm wheel and the compensator or flywheel. Where a rotating mass subject to speed variations is driven through an elastic connection there is often a tendency to hunt. In the case of the present apparatus were the film drum to be driven through the elastic connection rather than the sprockets the effect of hunting on the reproduction of the sound could not be tolerated. As regards movement of the film in the picture projecting apparatus, however, speed variations due to hunting are not noticed by a person observing the pictures. It will therefore be seen that by means of the apparatus which I have disclosed herein the drum which supports and drives the film at the point of sound control has a non-elastic connection with the driving motor and in addition to the inherent inertia effect of the motor rotor operating at a high speed also has a flywheel directly associated with its shaft. The drive of the film in all other parts of the machine is through an elastic member which while preserving proper synchronism between the pictures and sound absorbs such speed variations as occur in the other parts of the machine and prevent their reaction on the sound reproducing apparatus.

In the modification illustrated by Fig. 2 I have shown instead of the cushion ring 43 in the drive connection to the sprockets the coil spring 54 having its ends secured respectively to the ring 42 and the worm wheel 28.

What I claim as new and desire to secure by Letters Patent of the United States is:—

1. In film phonograph apparatus of the character described, driving means for the film comprising a rotatable member arranged to engage the film adjacent the point of control, film driving apparatus spaced from said rotatable member and also arranged to engage the film, a motor having driving connections with said rotatable member and said driving apparatus, inertia means associated with said driving apparatus, and an elastic member between the inertia means and the motor.

2. In film phonograph apparatus of the character described, film driving means comprising a rotatable member arranged to engage the film adjacent the point of control, a film driving member subject to variations in film resistance, inertia means associated with said film driving member, a motor driven shaft, a substantially inelastic connection between said shaft and the rotatable member, and an elastic connection between said shaft and the film driving member.

3. In film phonograph apparatus of the character described, a film driving means comprising a drum arranged to move the film at a uniform speed at the point of control, a film driving sprocket subject to variations in film resistance, inertia means associated with said sprocket, a motor driven shaft, a substantially inelastic connection between said shaft and said drum, and an elastic connection between said shaft and said sprocket.

4. In film phonograph apparatus of the character described, a film driving drum having a flywheel associated therewith, a sprocket arranged to withdraw the film from a take-off reel, means arranged to rotate a take-up reel for the film, a common driving motor having an inelastic connection with said drum, a flywheel associated with said sprocket and said means and an elastic member connecting the motor with said sprocket and said means.

In witness whereof, I have hereunto set my hand this 26th day of March, 1929.

CHARLES L. HEISLER.